(12) United States Patent
Pothuaud

(10) Patent No.: US 7,609,867 B2
(45) Date of Patent: Oct. 27, 2009

(54) METHOD FOR DETERMINING A THREE-DIMENSIONAL STRUCTURE FROM A TWO-DIMENSIONAL IMAGE, IN PARTICULAR A BONE STRUCTURE

(75) Inventor: Laurent Pothuaud, Lege Cap Ferret (FR)

(73) Assignee: Pascal Carceller, Bordeaux (FR), part interest ( * ) Notice: Subject to any disclaimer, the term of this patent is extended or adjusted under 35 U.S.C. 154(b) by 0 days.

(21) Appl. No.: 10/583,134

(22) PCT Filed: Dec. 17, 2003

(86) PCT No.: PCT/FR03/03768

§ 371 (c)(1), (2), (4) Date: Nov. 7, 2006

(87) PCT Pub. No.: WO2004/057512

PCT Pub. Date: Jul. 8, 2004

(65) Prior Publication Data

US 2007/0140534 A1 Jun. 21, 2007

(30) Foreign Application Priority Data

Dec. 17, 2002 (FR) .................................. 02 16069

(51) Int. Cl.
*G06K 9/00* (2006.01)

(52) U.S. Cl. ........................ 382/128; 382/132; 382/264; 600/407; 378/18

(58) Field of Classification Search ................. 382/128, 382/133, 264, 132; 600/407; 378/54; 128/661, 128/660, 653; 424/551; 514/451, 54
See application file for complete search history.

(56) References Cited

U.S. PATENT DOCUMENTS

| | | | | |
|---|---|---|---|---|
| 5,915,036 A | * | 6/1999 | Grunkin et al. | ............. 382/132 |
| 5,931,780 A | * | 8/1999 | Giger et al. | ................. 600/407 |
| 6,205,348 B1 | * | 3/2001 | Giger et al. | ................. 600/407 |
| 6,226,393 B1 | * | 5/2001 | Grunkin et al. | ............. 382/128 |
| 6,385,283 B1 | * | 5/2002 | Stein et al. | ..................... 378/54 |
| 6,445,767 B1 | * | 9/2002 | Karellas | ..................... 378/98.8 |
| 7,120,225 B2 | * | 10/2006 | Lang et al. | ..................... 378/54 |
| 7,215,806 B1 | * | 5/2007 | Bechwati et al. | ............ 382/133 |
| 7,324,660 B2 | * | 1/2008 | Oosawa | ..................... 382/100 |

OTHER PUBLICATIONS

High resolution Magnetic resonance Imaging: Three dimensional trabecular bone architecture and biomechanical properties, Majundar et al, 1998.*

* cited by examiner

*Primary Examiner*—Vikkram Bali
*Assistant Examiner*—Nancy Bitar
(74) *Attorney, Agent, or Firm*—Young & Thompson

(57) ABSTRACT

The object of the invention is a process for determining the mechanical resistance of a bone from a digitized two dimensional image, obtained by imaging, characterized in that there is carried out a correlation between the bone mineral density determined from this two dimensional image by any means suitable to this type of image, and a structural parameter obtained from the same two dimensional image.

8 Claims, 5 Drawing Sheets

Linear model

Linear model

Exponential model

METHOD FOR DETERMINING A THREE-DIMENSIONAL STRUCTURE FROM A TWO-DIMENSIONAL IMAGE, IN PARTICULAR A BONE STRUCTURE

The present invention relates to a process for determining a three dimensional structure from a two dimensional image, particularly that of a bone.

BACKGROUND OF THE INVENTION

Osteoporosis is a malady which affects a large number particularly of women after menopause toward age 50, given that this malady can affect anyone at any age. It is characterized by a low bone mass and a deterioration of the bone tissue. These degradations lead to great risk of fractures, particularly of the hip, of the vertebral column and of the wrist.

Of course there exist a number of risk factors but this is not enough to determine the probability of a person fracturing an element of his skeleton given that there is no preliminary symptom.

This malady is widespread in the population and will increase because of particularly the sedentary lifestyle and the aging of the population.

However, the treatment of persons after fracture is very long and very costly because this involves long term care. The consequences are often serious because they lead to invalidism or even death of the patient.

Also, it is necessary to prevent this type of affliction but after determining the fracture risk, which is the only resort of the practitioner.

If it is possible to predict the risks, the practitioner then has treatments for hormonal therapy and by other pharmacological products such as calcitonin or biophosphenates, in addition to advice as to healthy lifestyle to attempt to avoid this affliction.

There are apparatuses to determine the bone density, called densitometers.

It has been thought that if the bone density were known, and compared with standard curves, the practitioner could then determine the risk and establish a suitable diagnosis and prescribe a satisfactory treatment.

This is what is done at present.

DESCRIPTION OF THE RELATED ART

From U.S. Pat. No. 5,774,520, it is known that the probability of a fracture is directly connected to bone density.

Densitometers available commercially use x-rays or low energy gamma rays. The absorption being proportional to the bone density, the two can thus be correlated to have a satisfactory result permitting comparisons. This patent teaches working with two sources of the emission of photons so as to process the dispersion that arises because of the osseous materials being considered as homogeneous, but the other liquid materials, the muscular tissue, the cartilages cannot be considered as a single homogeneous material.

Another U.S. Pat. No. 6,385,283 uses the density but combines this measurement with images permitting determining the risk of fracture. These images are made from the vertebral column of the patient and the operator determines the presence of beginning fractures. Moreover, as in the known prior art, this information is compared with data acquired from numerous cases. This diagnosis is refined by the practitioner from the history of the patient and by introduction of supplemental risk factors.

Patent application WO 86/07531 proposes providing an image of a given bone, for example the calcaneum, at an age at which the patient normally has his full osseous mass. Then, the process consists in providing successive images of this same bone to permit the practitioner to carry out comparisons and to determine the development so as to draw conclusions as to the degree of risk of fracture.

All these methods and other devices are based on a single measurement of the density of the osseous material.

However, so that the practitioner can arrive at a satisfactory diagnosis, it is necessary that he have information other than the density alone.

The definition of osteoporosis is given by the WHO: "disorder characterized by a low osseous mass and alterations of the microarchitecture of the osseous tissue, leading to increase of fragility of the bone and as a result an increase in risk of fracture"

Thus there exist analyses of osseous material in vivo that are more sophisticated, from analyses of blood and urine useful as osseous markers but these analyses are costly, difficult for the patient and, in any case, give indications of composition of the material but not indications of its structure.

However, it will be understood that the osseous material has a different resistance according to whether there is more or less quantity of material, which results from the density measurement. On the other hand, for a same osseous density and hence for a same quantity of material, according to the architecture of the osseous structure, the mechanical resistance can vary greatly.

What are useful for a practitioner, are the mechanical properties of the bone of a patient leading directly to the risk of fracture. When there is a decrease of osseous resistance, there is a conjugation of two factors, the decrease of the osseous mineral quantity, and the change of the bone structure.

At present, there is no means permitting determining the bone structure. There can be used magnetic resonance imagery or scanning, but these are difficult and costly examinations, particularly if it is necessary to carry out a longitudinal study of the patient.

Moreover, the capture of three dimensional images from imaging means is at present limited by the capacities of these means because the spatial resolution is greater than the dimensions of most of the connection spans permitting carrying out connectivity, which is to say the connections between the three dimensional network nodes.

SUMMARY OF THE INVENTION

The process according to the present invention will now be described in detail, so as to permit by analysis of a two dimensional image, estimating the mechanical parameters.

According to the invention, the process of determination of the mechanical resistance of a bone, according to the invention, from a digitized two dimensional image, obtained by imaging, is characterized in that there is carried out a correlation between the bone mineral density determined from this two dimensional image by any means suitable for this type of imaging, and a structural parameter obtained from the same two dimensional image.

Particularly, recourse is had to a correlation of the exponential type.

This correlation is used by associating the bone mineral density and said structural parameter, to determine the ultimate strain $C_u$ of the bone.

More precisely, the structural parameter $\alpha$ is determined, obtained by the following sequence of steps:

a) choosing at random a pixel of the two dimensional image which is at a gray level h(O), b) choosing a straight line from this point having a direction also determined at random, c) moving a distance r along this straight line, h(r) being the gray level of this new point, d) computing the variance of the gray levels with the formula: $V(r)=[h(r)-h(O)]^2$, e) tracing the curve associated with V(r) on a log-log scale, and f) determining the slope of this log-log curve which represents said parameter α.

So as to improve the precision, steps a) to d) are repeated a sufficiently large number of times to make the function variance V(r) converge, by means of the assembly of repetitions.

According to another characteristic of the invention, there is carried out a correlation between the bone mineral density obtained from this two dimensional image and said parameter α evaluated from the same two dimensional image according to the mathematical model:

$$C_u' = b_0 + b_1 * \exp(b_2 * DMO) * \alpha$$

wherein $b_0$, $b_1$, $b_2$ are the coefficients obtained by nonlinear regression and $C_u'$ the prediction of the ultimate stress $C_u$ of the bone.

There is determined a correlation between the parameter α and a three dimensional parameter of the trabecular network and the bone and a three dimensional parameter can be the connectivity density $\chi_v$.

BRIEF DESCRIPTION OF THE DRAWINGS

To support this description, drawings are attached and the figures that they represent illustrate the description and show essentially the results obtained.

DETAILED DESCRIPTION OF THE PREFERRED EMBODIMENTS

Figure 1:
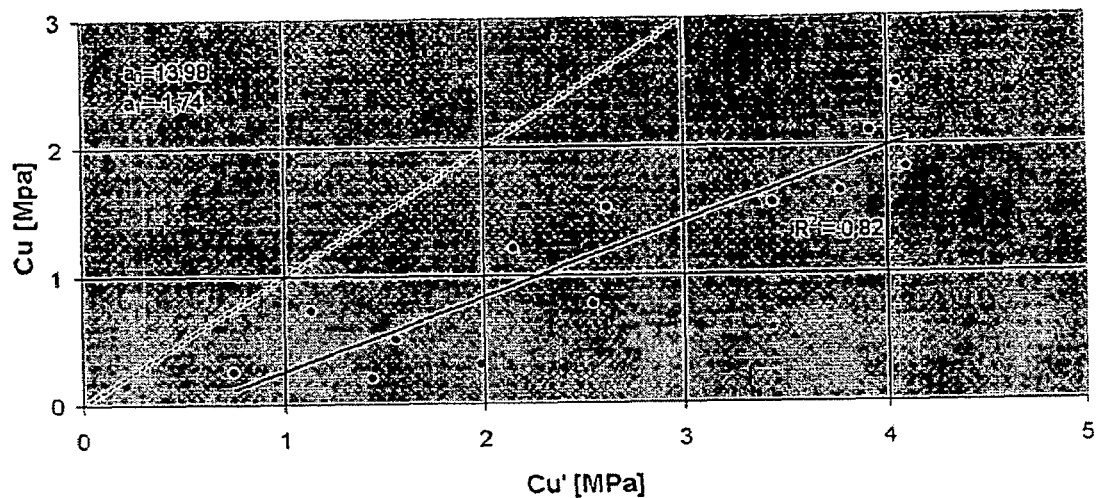
FIG. 1: curve of results with a linear model, $C_u$ as a function of $C_u'$

The study related to a trabecular or spongeous bone which constitutes about 20% of the bone material. The cortical bone which surrounds it ensures the rigidity of the entire bone and hence of the skeleton, whilst the tribecular bone ensures the absorption and resistance to compressive forces.

According to the invention, it is considered that the tribecular structure comprises spans which are interconnected and the mechanical resistance of the whole results from this connection, which is to say the number of closed loops. The mechanical resistance also results from the degree of mineralization of these spans, mineralization which is an important parameter.

The process consists in analyzing a digitized image obtained in the present case from X ray emission. This image is a projection on the surface of a three dimensional structure having been traversed by the emitted photons.

Each pixel which constitutes the image can be analyzed independently but then there can be determined only the bone mineral density although it would be desirable not only to analyze a pixel in an isolated fashion but to analyze them each with respect to the others.

The radiation spectrum should be the most monochromatic possible so as to avoid too great drift of the energy of the photons.

Thus, if the energy varies the penetration will vary and will give nuances of gray on the image that can lead to errors by giving the impression of absorption there where there is none.

From this image obtained with a narrow spectrum, it is known that each elemental volume undergoes a direct action of the photons, perpendicularly but also an indirect action of the incident rays diffused by the adjacent elemental volumes after they have been themselves traversed.

So as to overcome diffusion, there can be used preferably two separate energies. There are two equations with two unknowns and there can thus be deduced the portion of real attenuation which directly interests the present process and the portion resulting from diffusion.

If the ultimate stress $C_u$ (MPa) is sought, it is necessary to take account of the following parameters:

$V_0$: analysis volume (mm$^3$)

$V_1$: solid volume (mm$^3$)

$f_s$: volume fraction of solid with the correlation $f_s = V_s/V_0$ $\beta_0$: number of mass of the solid portion (which is to say the assembly of the connected or disconnected portions), this number is generally equal to 1.

$\beta_2$: number of internal surfaces, which is to say the holes resulting from the internal microporosity of the spans or the working scale, this porosity not being visible, this number is generally equal to 0.

$N_{EP}$: Euler-Poincaré number

X: connectivity with the relationship $\chi = \beta_0 + \beta_2 - N_{EP}$ $\chi_v$: connectivity density (mm$^{-3}$) with the relationship $\chi_v = \chi/V_0$ The process according to the present invention seeks to permit correlating two measurable parameters and to find the relationship which connects them.

1/ If there is used a linear model such as:

$$C_u = a_0 * f_s + a_1$$

$C_u'$ being a predicted value for $C_u$ $a_0$ and $a_1$ are coefficients of linear regression, there is a simple correlation of $C_u$ with $f_s$.

The obtained curve is shown in FIG. 1 and it will be seen that the dispersion is very great. If for example $f_s$ is taken to be constant, the variation of the values of $C_u$ is great.

This linear model cannot be followed, because its results are insufficiently precise, but it can nevertheless serve as a comparison.

2/ If there is used an exponential model such as:

$$C_u = b_0 + b_1 * \exp(b_2 * f_s) * \chi_v$$

Wherein $b_0$, $b_1$, $b_2$ are coefficients obtained by nonlinear regression (method of generalized least squares) and $C_u'$ the prediction of the ultimate stress $C_u$ of the bone.

Figure 2:
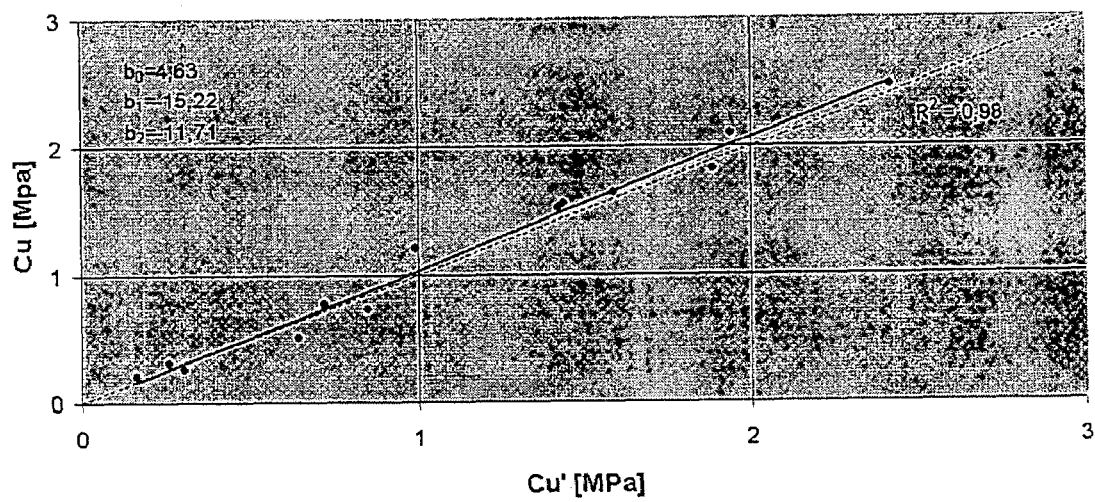
FIG. 2: curve of results with an exponential model, $C_u$ as a function of $C_u'$

The dispersion is greatly limited, see FIG. 2. $C_u'$ is estimated from $f_s$ and $\chi_v$.

Figure 3:
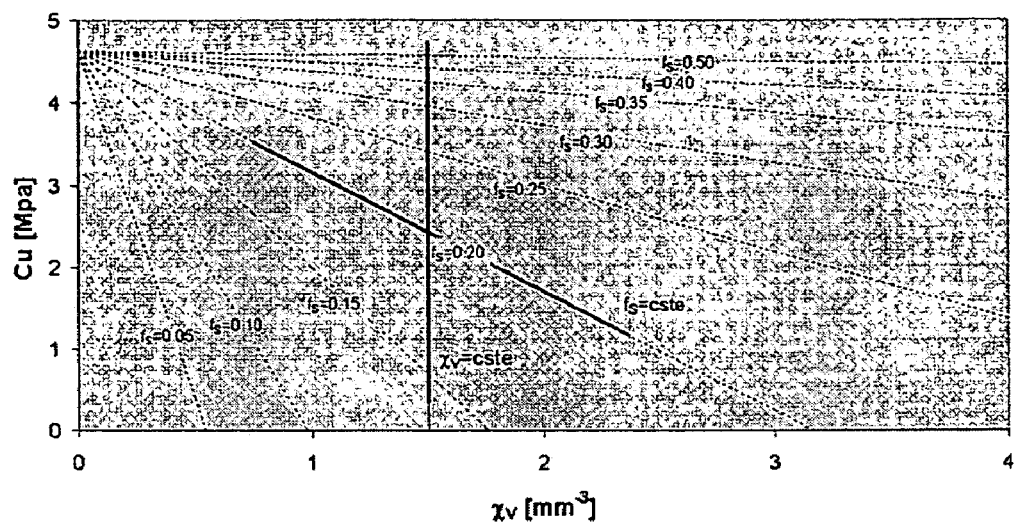
FIG. 3: graphical representation of $C_u$ as a function of $\chi_v$

These variations are shown in FIG. 3.

If $f_s$ and $\chi_v$ increase, $C_u$ increases. This is perfectly natural, if the volumetric fraction of solid increases and the connectivity increases, and hence the ultimate stress increases.

If $\chi_v$ is fixed, then $C_u$ is a function directly of $f_s$, in an exponential manner. At constant connectivity, the ultimate stress increases as a function of the increase of the bone density.

If $f_s$ is fixed, then $C_u$ is a direct function of $\chi_v$, in a linear manner but the ultimate stress $C_u$ decreases when the connectivity increases.

If the solid fraction is constant, it will be seen that the ultimate resistance $C_u$ decreases linearly as a function of the connectivity.

The more nodes in the structure, the more this structure becomes fragile, in a surprising manner, contrary to a well established prejudice.

Figure 4:
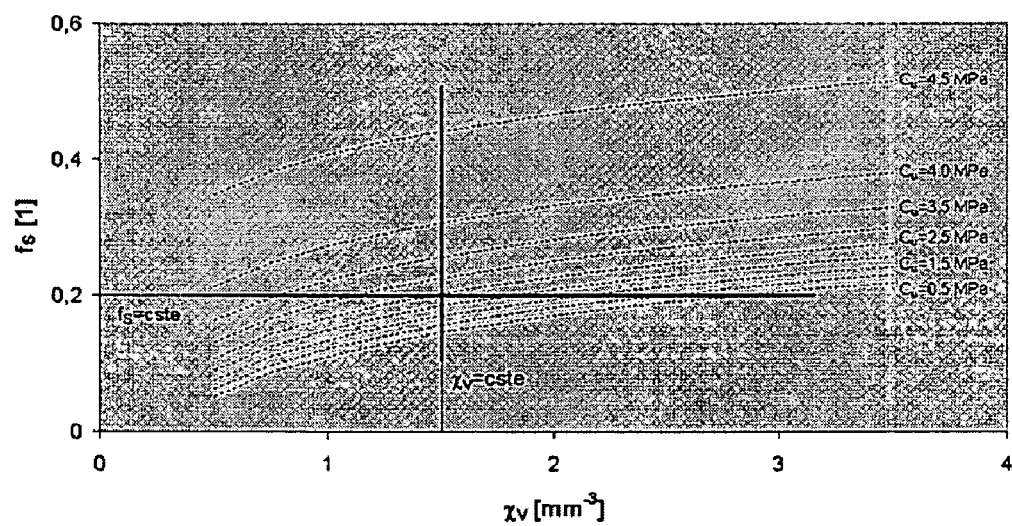
FIG. 4: representative of $f_s$ as a function of $\chi_v$

There can thus be traced the model of representation of FIG. 4, which shows the values of $C_u$.

To determine connectivity, it is thus necessary to find a parameter which follows a same law and which will be as independent as possible of the bone density so as not to be influenced.

There could be carried out a computation from two measurable parameters such as the bone volume and the connectivity, these two parameters being obtained particularly by MRI.

On the other hand, obtaining values by this method uses costly apparatus, hardly available, which leads to predictions of a high price preventing a longitudinal follow up and hence a massive expenditure by the patients.

It is thus necessary to find two values measurable for example from simple densitometry, which is itself altogether approachable and which can be regularly repeated. Thus, densitometries have already been carried out in a massive way for numerous applications. The cost for patients can be very great.

The process according to the present invention consists in determining these two measurable parameters as the bone volume fraction and connectivity, or more exactly parameters which could be correlated with them in a sufficiently narrow way to give satisfactory results.

Figure 7:
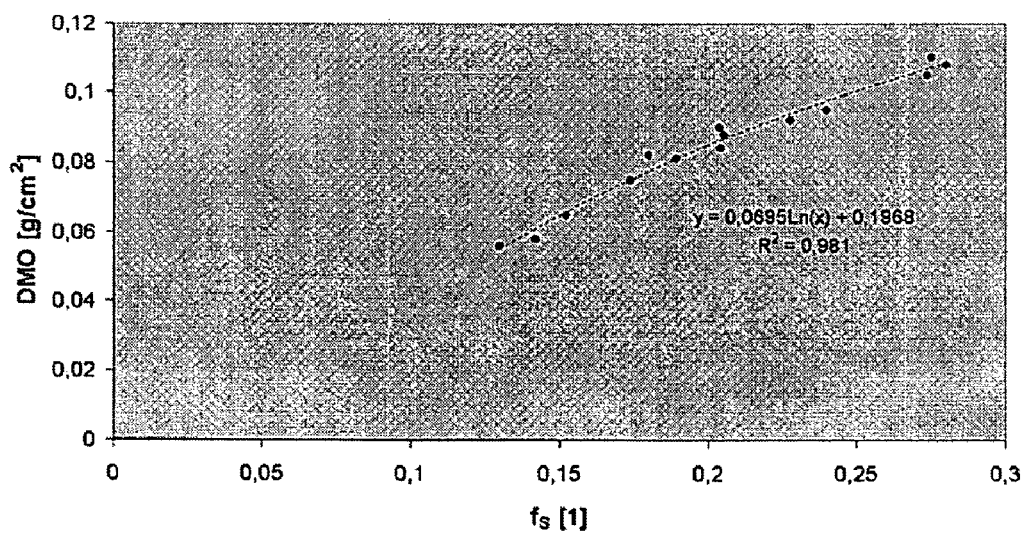
FIG. 7: bone mineral density curve as a function of $f_s$

The first rapidly measurable and reliable parameter is the bone mineral density. Apparatus has been developed to carry out these measurements in a reliable and reproduceable way. If the bone mineral density curve is traced as a function of $f_s$, it will be seen that the dispersion is low and that bone mineral density can be used in lieu of and in place of $f_s$. See FIG. 7. The first parameter is obtained.

The second parameter is called $\alpha$ and is determined from a digitized two dimensional image for example obtained with x ray.

To determine this new parameter $\alpha$, there is first of all chosen at random a two dimensional pixel of the image which is at a gray level h(O).

There is then selected a straight line from this point having a direction also determined at random.

We move by a distance r along this straight line, h(r) being the gray level of this new point.

The variance of the gray levels is then calculated, which gives:

$$V(r) = [h(r) - h(O)]^2$$

Figure 5:
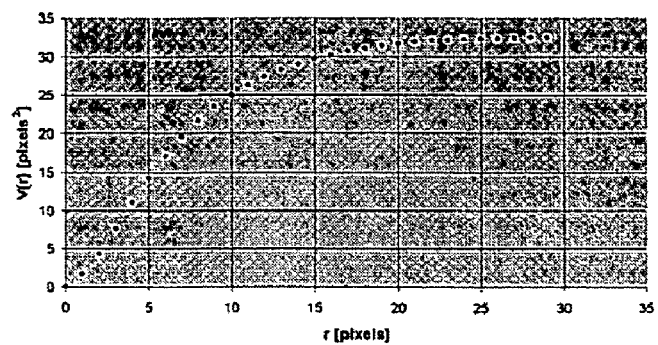
FIG. 5: curve of the function V(r)

The process is repetitive, with a repetition of these steps a number of times sufficiently great, and at random, to determine $\alpha$. There is thus caused to converge the mean variance function V(r) from the assembly of repetitions. This permits obtaining by computation an assembly of points and the associated curve is shown in FIG. 5.

Thus, the more one determines points having a same gray level adjacent the selected pixel, the more one finds himself in the material and hence the more one is homogeneous and the more can be found the connection modes.

Figure 6:
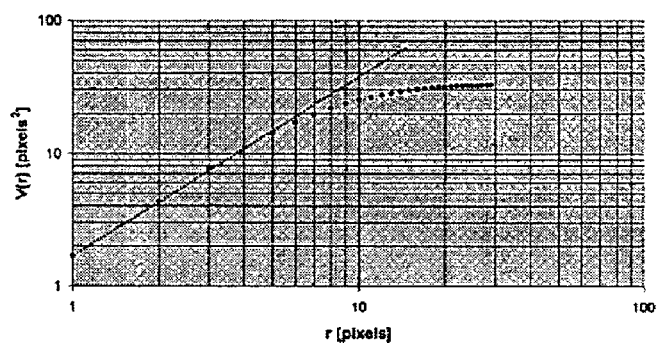
FIG. 6: determination of the parameter a from the log-log curve of the function V(r)

If the log-log curve of this function is traced, FIG. 6, it will be seen on the first five points in this instance, a linear behavior and the slope of this straight line is the coefficient called $\alpha$ and suitable for the present invention.

Figure 8:
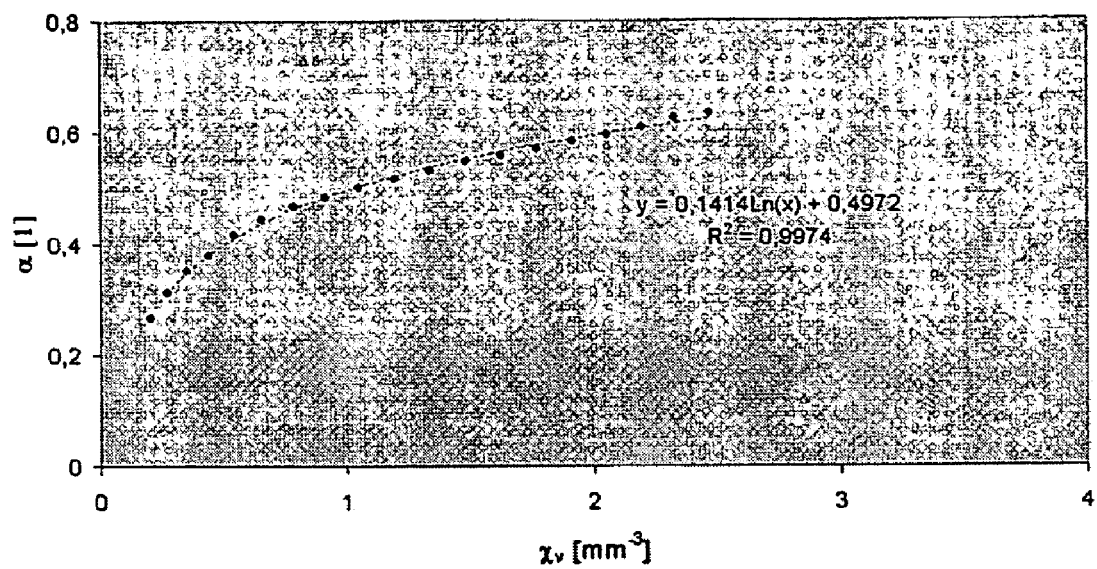
FIG. 8: curve of a as a function of $\chi_v$

If there is then traced the curve $\alpha$ as a function of the volumetric connectivity $\chi_v$, FIG. 8, it will be seen that there is a sufficient correlation so that $\chi_v$ can be replaced by $\alpha$.

Figure 9:
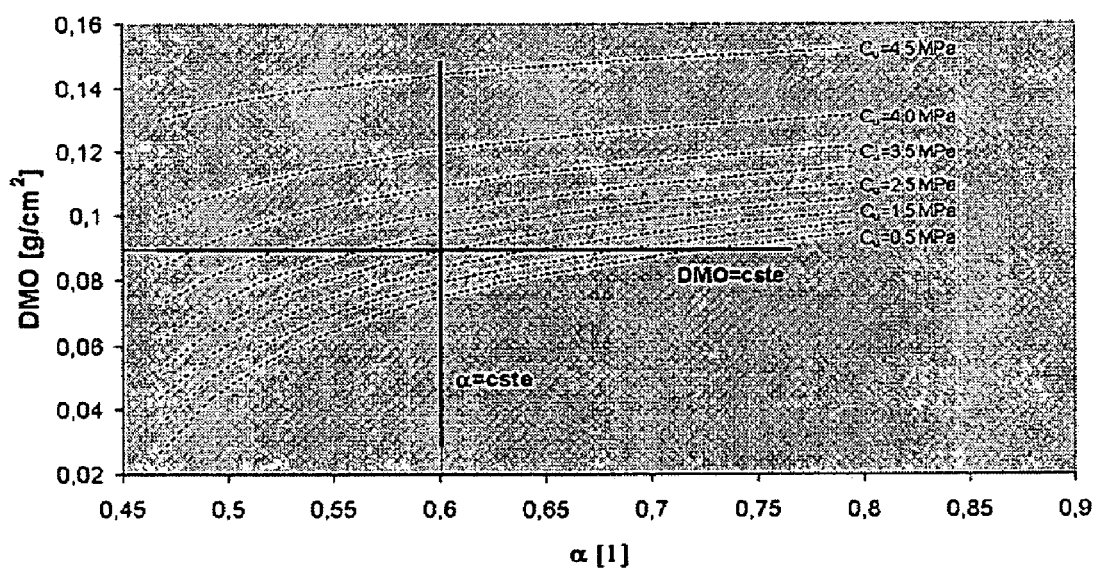
FIG. 9: curve of bone mineral density as a function of α

The curve of FIG. 9 can be deduced from the preceding curves, as a diagram which shows the relation between bone mineral density, $\alpha$ and $C_u$.

Bone marrow density and $\alpha$ are two parameters directly measurable and/or at least calculable from a same two dimensional image.

It will be seen on this diagram that when the bone marrow density remains constant, the ultimate stress diminishes when $\alpha$ increases.

This is entirely equivalent to the exponential model indicated above, with the bone fraction as a function of conductivity, see FIG. 4, except that the connectivity $\chi_v$ was not directly measurable whilst $\alpha$ is calculated from the two dimensional image, and hence quantifiable.

We can then write the same relationship but with the parameters determinable from the same image:

$$C_u = b_0 + b_1 * \exp(b_2 * DMO) * \alpha$$

Figure 10:
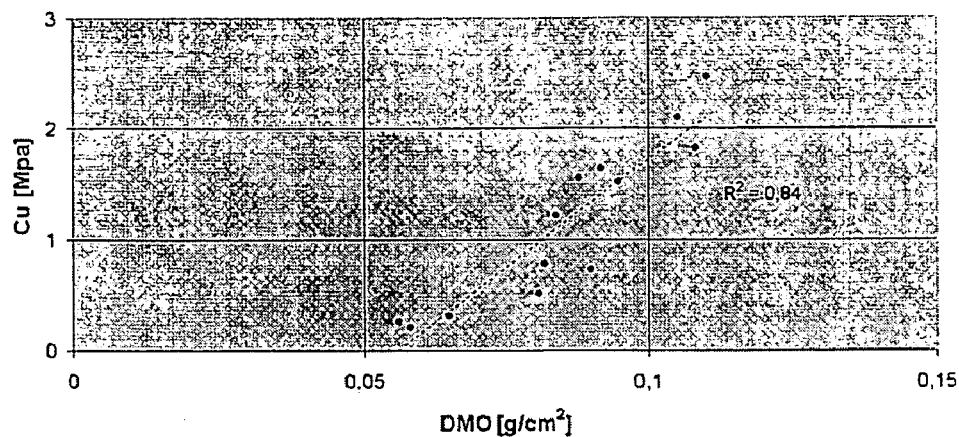
FIG. 10: linear model $C_u$ as a function of bone mineral density
Figure 11:
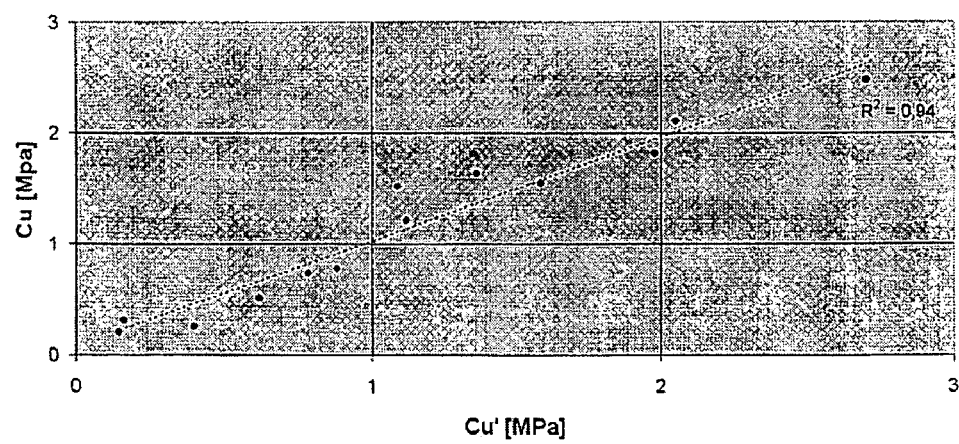
FIG. 11: curve of $C_u$ as a function of $C_u'$.

This is what FIG. 9 shows. The curve of FIG. 11 characterizes this exponential model of $C_u'$ as a function of $\alpha$. There will be seen a slight dispersion compared to that of the linear model whose curve is shown in FIG. 10. This is a non-limiting example which shows the possibility of connecting the bone density whose value is determined from a two dimensional image, to a structural parameter determined from this same two dimensional image to obtain the ultimate stress $C_u$.

It will be seen that it is possible to determine a correlation between the parameter $\alpha$ evaluated from the two dimensional image and a three dimensional characteristic of the trabecular network of the bone as the density of connectivity $\chi_v$.

There can thus be given an example obtained from femoral bone images obtained by absorption measurement with double energy which replaces an image obtained by x rays or gamma rays of low energy.

These images are those of a young woman of 17 years and the other of a woman aged 69. The two dimensional images thus obtained are analyzed according to the process of the invention.

There will be seen from measurement of bone mineral density the same values obtained directly by the densinometric system, in the two cases: 0.730 g/cm² in the trochanterial zone.

The calculated parameters $\alpha$ are respectively 0.56 for the young subject and 0.71 for the aged subject, thereby showing a notable difference and the parameter $\alpha$ which is the least corresponds to the best mechanical resistance of the bone $C_u$, that of the younger subject.

The invention claimed is:

1. A process for determining the mechanical resistance of a bone from a digitized two dimensional image, obtained by imaging, characterized in that a correlation is carried out between a bone mineral density determined from the two dimensional image by any means suitable to this type of image and a structural parameter $\alpha$, the structural parameter $\alpha$ obtained from the same two dimensional image, wherein the structural parameter α is determined by a series of the following steps performed by a computational device configured to process the digitized two dimensional image:

a) choosing a point at random at a first pixel of the two dimensional image, wherein the first pixel has a gray level h(O);
b) choosing a straight line starting from the point and having a direction also determined at random;
c) moving a distance r along this straight line to a new point at a second pixel, h(r) being the gray level of the second pixel at the new point;
d) computing a variance of the gray levels with the formula: $V(r)=[h(r)-h(O)]^2$;
e) tracing a curve associated with V(r) on a log-log scale; and
f) determining the slope of the curve as said parameter α.

2. The process for determining the mechanical resistance of a bone according to claim 1, wherein steps a) to d) are repeated a number of times sufficiently great to make the mean variance function V(r) converge over an assembly of the repetitions.

3. The process for determining the mechanical resistance of a bone according to claim 1, wherein the correlation between the bone mineral density obtained from the two dimensional image and said parameter α is evaluated from the two dimensional image according to a mathematical model:

$$C_u'=b_0+b_1*\exp(b_2*DMO)*60$$

wherein $b_0$, $b_1$, $b_2$ are coefficients obtained by nonlinear regression and $C_u'$ is a prediction of an ultimate stress $C_u$ of the bone.

4. The process for determining the mechanical resistance of a bone according to claim 1, further comprising:
determining a correlation between the parameter α and a three dimensional parameter of a trabecular network of the bone.

5. The process for determining the mechanical resistance of a bone according to claim 4, wherein the three dimensional parameter of the trabecular network of the bone is a connectivity density $\chi_v$.

6. The process for determining the mechanical resistance of a bone according to claim 2, wherein the correlation between the bone mineral density obtained from the two dimensional image and said parameter α is evaluated from the two dimensional image according to a mathematical model:

$$C_u'=b_0+b_1*\exp(b_2*DMO)*\alpha$$

wherein $b_0$, $b_1$, $b_2$ are coefficients obtained by nonlinear regression and $C_u'$ is a prediction of an ultimate stress $C_u$ of the bone.

7. The process for determining the mechanical resistance of a bone according to claim 2, further comprising:
determining a correlation between the parameter α and a three dimensional parameter of a trabecular network of the bone.

8. The process for determining the mechanical resistance of a bone according to claim 3, further comprising:
determining a correlation between the parameter α and a three dimensional parameter of a trabecular network of the bone.

* * * * *